United States Patent [19]

Plough

[11] Patent Number: 4,615,522
[45] Date of Patent: Oct. 7, 1986

[54] THERAPEUTIC FINGER EXERCISE DEVICES

[76] Inventor: Harold G. Plough, 803 E. New York St., Aurora, Ill. 60505

[21] Appl. No.: 630,534

[22] Filed: Jul. 13, 1984

[51] Int. Cl.$^4$ ............................................. A63B 5/00
[52] U.S. Cl. ...................................... 272/67; 128/26; 84/468
[58] Field of Search ...................... 272/67; 128/26, 77, 128/87 A; 84/465, 467, 468; 273/18, 23, 24; D21/198; 63/15; D11/26

[56] References Cited

U.S. PATENT DOCUMENTS 3,189,025  6/1965  Yaklin .................................. 128/26

FOREIGN PATENT DOCUMENTS 23149    of 1908  United Kingdom ................. 84/468
111276  11/1917  United Kingdom ................. 128/77

*Primary Examiner*—Richard J. Apley
*Assistant Examiner*—John L. Welsh
*Attorney, Agent, or Firm*—Mathew R. P. Perrone, Jr.

[57] ABSTRACT

An exercise device is formed from a generally single-piece, stiff frame having loops at the end of the frame for holding two non-adjacent fingers in a fixed position while leaving the remaining fingers free to exercise. This frame may be combined with a riser secured to the black keys on a piano for the purpose of exercising the hand and fingers. The riser is usable separately from the exercise device.

11 Claims, 9 Drawing Figures

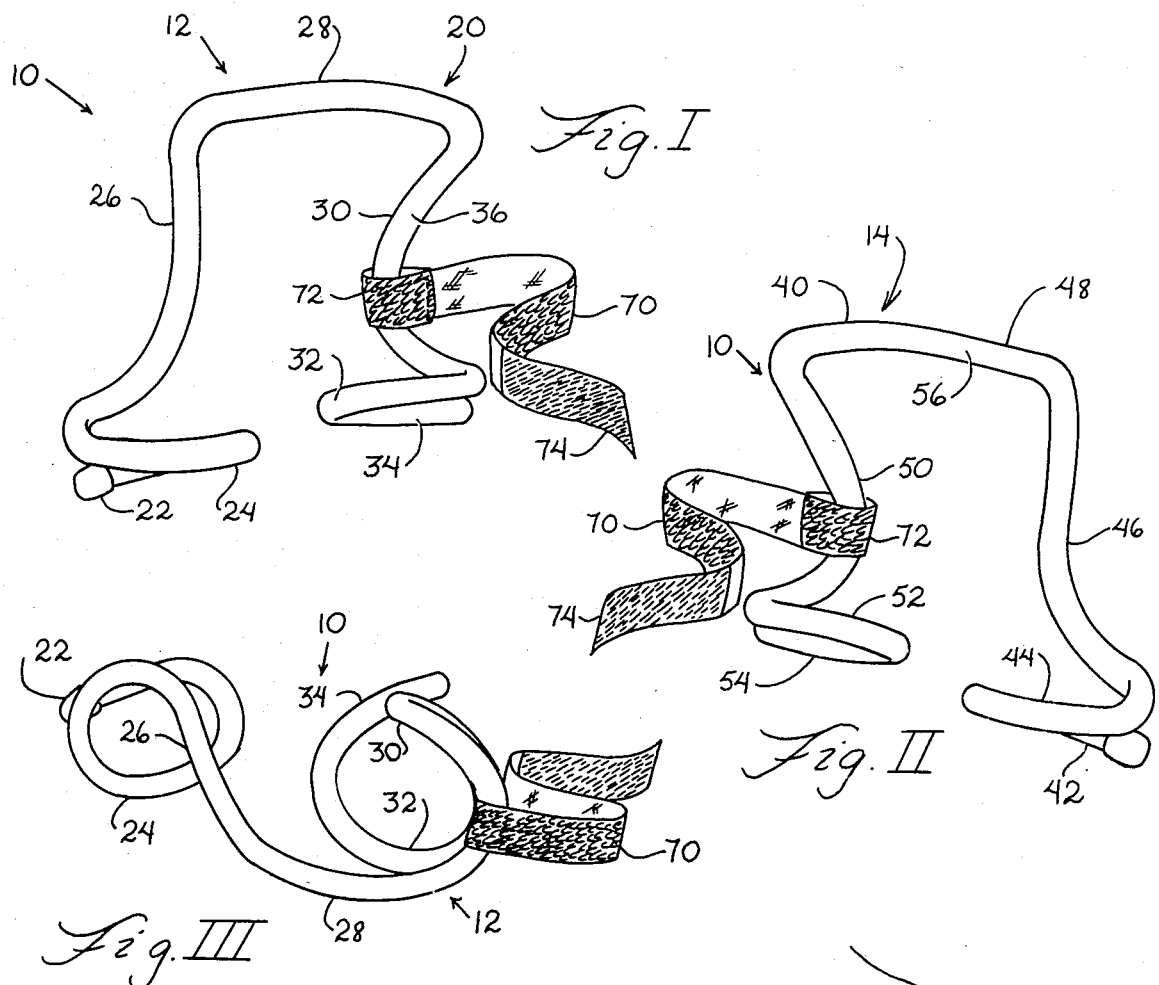
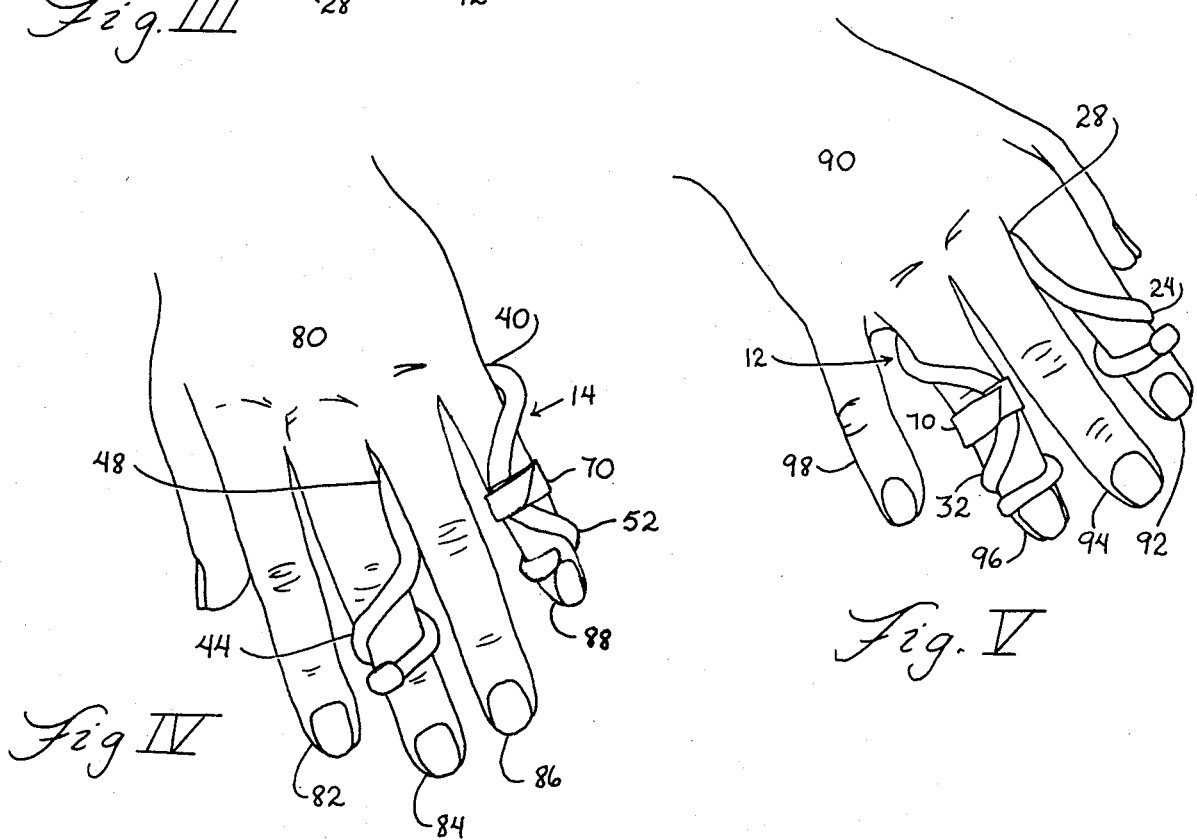

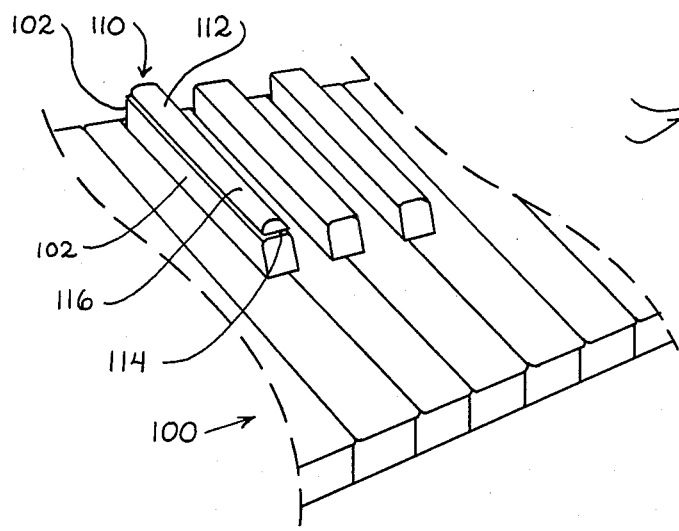
Fig. VI
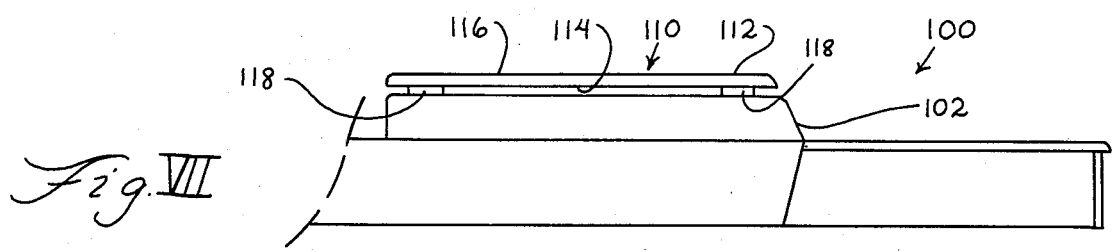
Fig. VII
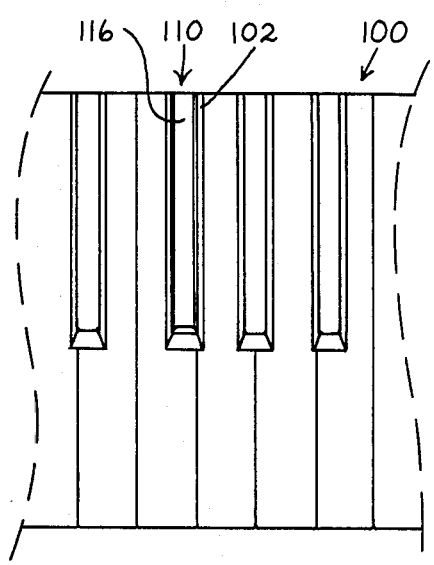
Fig. VIII
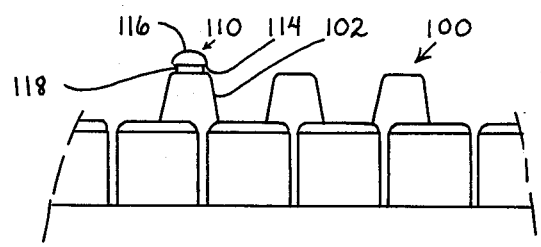
Fig. IX

THERAPEUTIC FINGER EXERCISE DEVICES

BACKGROUND OF THE INVENTION

This invention relates to exercise devices used jointly or separately for strengthening the hand and fingers, and more particularly to an exercise device for strengthening hands and fingers which will assist a pianist in developing the appropriate lifting strength and distance required of the better than average pianist.

Under a commonly used definition, there are about seven levels of piano student. These levels are (1) primary, (2) first grade, (3) second grade, (4) third grade, (5) fourth grade, (6) fifth grade, and (7) sixth grade. Primary is the lowest level, while sixth grade is the highest level. At the second grade level, it becomes very important to render the tendons in the hand more flexible. Merely practicing the piano cannot accomplish this required flexibility.

The artistry involved in playing the piano requires a high degree of manual dexterity. Unfortunately, this manual dexterity so required runs contrary to the standard physical structure of the hand. However, it is definitely possible to overcome the physical difficulties and achieve greater than usual piano skill.

Skill in playing the piano depends substantially on the lifting strength and distance reach of the fingers being equal to the striking strength of the fingers when the appropriate key is struck. This feature is sometimes difficult to achieve. The strain of lifting strength and distance contradicts in many respects the idea of striking the keys strongly, due to the physical structure of the fingers and the hand.

It is well accepted that certain types of exercise can overcome the problems set forth. However, as with any exercise, it is difficult to maintain and use that particular exercise in the proper fashion. It is also difficult to practice without a keyboard. If proper exercise can be achieved, without a keyboard, great advantages are obtained. If the same device can be used both with and without a keyboard to properly exercise, even greater advantages are achieved.

What is clearly needed is a device to assist with these particular difficulties. Such a device should clearly assist in developing lifting strength and independent finger action—while, at the same time, providing striking strength for the fingers. This device should also provide a manner of strengthening the appropriate muscles for that purpose.

SUMMARY OF THE INVENTION

Therefore, it is an object of this invention to provide a device for strengthening the hand.

It is a further object of this invention to provide a device for improving lifting strength of a finger.

It is a still further object of this invention to provide a device for improving distance reach of a finger.

Yet a further object of this invention is to provide a device for improving striking strength of a finger.

Also an object of this invention is to provide a device which renders the lifting strength substantially equal to the striking strength of a finger when a person is practicing at the keyboard.

Another object of this invention is to provide a device which improves the piano skill in pearling the keys.

Yet another object of this invention is to provide a device for strengthening the fingers.

Still another object of this invention is to provide a device for use without a keyboard.

A further object of this invention is to provide a device for use with a keyboard.

These and other objects of this invention (which other objects do become clear by considering the specification and claims of the instant application and claims as a whole) are achieved by providing a generally single-piece, stiff frame having loops at the end of the frame for holding two non-adjacent fingers in a fixed position while leaving the remaining fingers free to exercise. This frame may be combined with a riser secured to the black keys on a piano for the purpose of exercising the hand and fingers. In this fashion lifting strength, distance and striking strength are improved.

BRIEF DESCRIPTION OF THE DRAWING

FIG. I is a depiction of exercise device 10 of this invention as a right hand device 12.

FIG. II is a depiction of exercise device 10 of this invention as a left hand device 14.

FIG. III is an end view of FIG. I.

FIG. IV is a perspective view of left hand device 14 situated on left hand 80.

FIG. V is a depiction of right hand device 12 situated on right hand 90.

FIG. VI is a perspective view of black key riser 110 situated on black key 102 of piano 100.

FIG. VII is a side view depiction of black key riser 110 situated on black key 102 of piano 100.

FIG. VIII is a top view of black key riser 110 situated on black key 102 of piano 100.

FIG. IX is an end view of black key riser 110 situated on black key 102 of piano 100.

Throughout the Figures of the Drawings, where the same part appears in more than one Figure, the same number is given thereto.

DESCRIPTION OF THE PREFERRED EMBODIMENTS

A hand exercise device of stiff coated wire construction restrains fingers while permitting other fingers to exercise and provides good exercise means for fingers of a pianist, athlete, or other person desiring to develop manual dexterity. The exercise device may be used together with a riser on the black keys of a piano. It is especially designed to strengthen the hands of a pianist or other keyboard instrument player.

Referring now to FIG. I and FIG. III, exercise device 10 is shown in right hand device 12. Right hand device 12 includes right wire frame 20. Right wire frame 20 has right parallel bar 22 at one end thereof. Right parallel bar 22 serves as an indicator to show the student when the hand and right wire frame 20 are being held in proper position, due right parallel bar 22 being parallel to the piano or another suitable practice surface.

Adjacent right parallel rod 22, as a continuation of wire frame 20, is right rod ring 24. Adjacent right rod ring 24 is right rod 26. Right rod 26 extends into right loop 28. Right loop 28 extends into right arc 30. Right arc 30 extends into rod right arc ring 32. Right arc ring 32 fits on the right ring finger, 96, or the right minor finger 98. When right wire frame has right coating 36 thereon, right coating 36 is colored to provide aesthetically pleasing features to the device. Right coating 36 also provides padding comfort for exicise device 10.

Referring now to FIG. II, exercise device 10 is shown as left hand device 14. Left hand device 14, for fitting on the left hand of a person, includes left wire frame 40, which has a left parallel bar 42. Left hand device 14 is substantially a mirror image of right hand device 12.

Left parallel bar 42 extends into left rod ring 44. Left rod ring 44 extends into left rod 46. Left rod 46 extends into left loop 48. Left loop 48 extends into left arc 50. Left arc 50 extends into left arc ring 52. Left arc ring 52 can fit on the left hand and more specifically on the left ring finger 86 and the left minor finger 88. Left arc ring 52 extends into left tip 54. Left wire frame 40 is covered by left coating 56 for aesthetic purposes. Also, like right coating 36, left coating 56 serves cushioning purposes.

In FIG. I and FIG. II, shown on left arc 50 and right arc 30 is strap 70. Strap 70 has a loop end 72 looped around either right arc 30 or left 50. Strap 70 extends into a self adhering connector 74, of the Velcro (Velcro is a registered trademark) type, self adheres after being looped around the desired finger to hold the finger excerciser 10 on the respective hand. Self-adhering connector may also be a permanent loop.

Left wire frame 40, as shown in FIG. IV, fits on left hand 80. Rod ring 44 is shown on left index finger 84. Arc ring 52 is shown on left minor finger 88. This leaves left fore finger 82 and left ring finger 86 free to excercise.

Referring now to FIG. V, right wire frame 20 is shown as positioned on right hand 90. Rod ring 24 is on right fore finger 92 while arc ring 32 is on right ring finger 96. This leaves right minor finger 98 and right index finger 94 free to excercise. This means that loop 28 is under right ring finger 96 and right index finger 94.

By the same token, the structure of FIG. IV shows left loop 48 under left minor finger 88 and left ring finger 86. Both left loop 48 and right loop 28 contact the finger where the finger meets the palm of the hand. Thus, it can be seen that device 10 forces the fingers to exercise independently.

When exercise device 10 is used in combination with black key riser 110 shown in FIG. VI, FIG. VII, FIG. VIII, and FIG. IX, the exercise of the hand is even more pronounced. Black key riser 110 is removably secured to piano 100 on black key 102. Any number of risers 110 may be used on an equal number of black keys 102. Riser 110 forces the finger into an exaggerated reach and, thereby, strengthens the reaching capability. It is clear that black key riser 110 and exercise device 10 may be used separately or together.

As is shown in FIG. VI and FIG. VII, black key riser 110 includes a thin, tapered rod 112 having a flat side 114 adjacent the black keys 102 of a piano 100 or similar instrument (not shown) and a rounded decorative side 116 (shown by a top view of FIG. VIII) oppositely disposed from flat side 114. Black key riser 110 is made of plastic or similar material.

As shown in FIG. VII and FIG. IX, on flat side 114 are secured two adhesive patches 118 for securing riser 110 to the black keys such as black key 102 of piano 100 in a removable fashion. Flat side 114 is adjacent black key 102. One or more such adhesive patch 118 may be used, while two patches 118 are preferred. Adhesive patch 118 provides a reusable adhesive so that riser 110 may be attached or removed as desired.

Riser 110 is a practice aid. Use of the riser 110 forces the pianist to exaggerate and strengthen finger lift. When practice is over, riser 110 is easily removed from piano 100 for standard playing. When practice is desired, riser 110 is easily and temporarily reattached for practice due to reusable adhesive in patch 118.

A combination of the exercise device 10 positioning the fingers and forcing them to work combined with the increased lifting strength caused by the riser 110, permits the pianist to exercise and strengthen his hand. Exercise device 10 may be used at a keyboard or away from a keyboard. As is clear from the above discussion, riser 110 and exercise device 10 may be used separately or in combination.

It becomes clear from this disclosure that the risers 110 can be made of any suitable material. The adhesive patch 116 is secured to the risers 110 on one side and has sufficient adhesive on the other side to provide for a removable attachment of the risers 110 to the black keys 102. Any suitable rigid material and adhesive may be used to make the risers 110. In a like fashion, any suitable material may be used to make the exercise device 10. The device 10 may be made of coated wire or similar rigid yet bendable material. The strap 70 may be made of any self adhering material or may even be a permanent loop. The trademarked item Velcro is most suitably used as the strap.

The following examples are offered for the purpose of illustrating the disclosed and claimed invention. The specification and claims are to be taken as a whole, without drawing undue limitations thereon from the instant examples.

EXAMPLE 1

A piano student of the second grade is assigned five-finger exercises for the left hand and the right hand for a period of twenty minutes per day. The piano instructor evaluates the student's improvement over a five-week period. The piano student then continues the exercise for a second five week period, but uses the device 10 of this invention on the right hand only. At the end of the second five week period, the right hand shows much greater improvement than the left hand. The results are such to indicate that long term practice of years with exercise device 10 can assist the student in skill development.

The position of exercise device 10 is as shown in FIG. V for ten minutes of the twenty minutes. Right wire frame 20 is shown as positioned on right hand 90. Rod ring 24 is on right fore finger 92 while arc ring 32 is on right ring finger 96. This leaves right minor finger 98 and right index finger 94 free to excercise. This means that loop 28 is under right ring finger 96 and right index finger 94. For the remaining ten minutes of the twenty minutes, loop 28 is on right minor finger 98, while ring 24 is on right index finger 94.

EXAMPLE 2

The procedure of Example 1 is repeated but for the fact that risers 110 are used on the piano during the second five week period instead of exercise device 10. The result of practicing with the risers 110 are improved over the results of practicing without the risers 110. The results are such to indicate that long term practice of years with risers 110 can assist the student in skill development.

EXAMPLE 3

The procedure of Example 1 is repeated but for the fact that exercise device 10 and risers 110 are used on the piano in combination. The result of practicing with the exercise device 10 and risers 110 in combination are improved over the results set forth in Example 1.

Because of this disclosure and solely because of this disclosure, various modifications to exercise device 10 and riser 110 can become clear to those having ordinary skill in the art. Such modifications are clearly covered hereby.

What is claimed and sought to be secured by Letters Patent of the United States is:

1. A finger exercise device wherein said device includes:
   a. a generally single-piece, stiff, wire frame having finger holding means at each end of said wire frame for holding two non-adjacent fingers in a substantially fixed position while permitting other fingers to exercise and providing good exercise means for fingers of a person desiring to develop manual dexterity said finger holding means including a rod ring and an arc ring;
   b. said wire frame has a parallel bar capable of being held parallel to an exercise surface at a first end of said wire frame;
   c. said parallel bar has, as a continuation of said wire frame, said rod ring adjacent to said parallel bar;
   d. said rod ring has, as a continuation beyond said parallel bar, a rod adjacent to said rod ring, said rod having sufficient length to extend along a finger, wherein a rod plane containing said rod and tangential to said ring is substantially perpendicular to a ring plane containing said ring;
   e. said rod has, as a continuation beyond said rod ring, a loop, said loop having sufficient length to extend said rod along a second finger and under said second finger, wherein said loop occupies a loop plane substantially parallel to said ring plane;
   f. said loop has, as a continuation beyond said rod, an arc, wherein said arc occupies substantially the same plane as said rod plane;
   g. said arc has, as a continuation beyond said loop, said arc ring, wherein said arc ring occupies arc plane and said arc plane is between said ring plane and said loop plane;
   h. said rod ring, said loop, and said arc ring are on the same side of said rod plane
   i. said said arc is capable of being positioned on a back side of a hand; and
   j. said loop is oppositely disposed from said arc and on a palm side of a hand.

2. The finger exercise device of claim 1 wherein said device fits on the right hand.

3. The finger exercise device of claim 2 wherein a mirror image of said device fits on the left hand.

4. The finger exercise device of claim 1 wherein said device is coated for padding and decorative purposes.

5. The finger exercise device of claim 4 wherein said device further includes a securing means for securing said device to a hand.

6. The finger exercise device of claim 5 wherein said securing means includes a strap having a loop around said arc to attach said strap to said device.

7. The finger exercise device of claim 6 wherein said strap is positioned on said arc and is of sufficient length to wrap around a finger adjacent to said arc and self adhere and secure said device to a hand.

8. The finger exercise device of claim 7 wherein said strap is a permanent loop.

9. A method of developing muscular skills for playing a piano or similar keyboard instrument comprising:
   a. securing an exercise device to and restraining the movement of two alternating fingers of at least one hand, said exercise device including:
      (1) a generally single-piece, stiff, wire frame having finger holding means at the each end of said wire frame for holding two non-adjacent fingers in a substantially fixed position while permitting other fingers to exercise and providing good exercise means for fingers of a person desiring to develop manual dexterity said finger holding means including a rod ring and an arc ring;
      (2) said wire frame has a parallel bar capable of being held parallel to an exercise surface at a first end of said wire frame;
      (3) said parallel bar has, as a continuation of said wire frame, a rod ring adjacent to said parallel bar;
      (4) said rod ring has, as a continuation beyond said parallel bar, a rod adjacent to said rod ring said rod having sufficient length to extend along a finger, wherein a rod plane containing said rod and tangential to said ring is substantially perpendicular to a ring plane containing said ring;
      (5) said rod has, as a continuation beyond said rod ring, a loop said loop having sufficient length to extend said rod along a second finger and under said second finger, wherein said loop occupies a loop plane substantially parallel to said ring plane;
      (6) said loop has, as a continuation beyond said rod, an arc, wherein said arc occupies substantially the same plane as said rod plane;
      (7) said arc has, as a continuation beyond said loop, an arc ring, wherein said arc ring occupies arc plane and said arc plane is between said ring plane and said loop plane;
      (8) said rod ring, said loop, and said arc ring are on the same side of said rod plane;
      (9) said arc is capable of being positioned on a back side of a hand; and
      (10) said loop is oppositely disposed from said arc and on a palm side of a hand;
   b. holding said hand parallel to flat surface; and
   c. moving said fingers.

10. The method of claim 9 wherein a ring finger and forefinger are restrained while a minor finger and an index finger are exercised.

11. The method of claim 9 wherein a ring finger and forefinger are exercised while a minor finger and an index finger are restrained.

* * * * *